US012738127B1

(12) United States Patent
Markman et al.

(10) Patent No.: US 12,738,127 B1
(45) Date of Patent: Sep. 15, 2026

(54) SPORTS BETTING SYSTEM AND METHOD OF USING THE SAME

(71) Applicants: Reece Markman, Heath, TX (US); Jared Leidner, Dallas, TX (US)

(72) Inventors: Reece Markman, Heath, TX (US); Jared Leidner, Dallas, TX (US)

(*) Notice: Subject to any disclaimer, the term of this patent is extended or adjusted under 35 U.S.C. 154(b) by 0 days.

(21) Appl. No.: 19/074,147

(22) Filed: Mar. 7, 2025

(51) Int. Cl.

| | |
|---|---|
| ***A63F 9/24*** | (2006.01) |
| ***A63F 11/00*** | (2006.01) |
| ***G06F 13/00*** | (2006.01) |
| ***G06F 17/00*** | (2019.01) |
| ***G06Q 50/34*** | (2012.01) |
| ***G07F 17/32*** | (2006.01) |
| ***G07F 17/42*** | (2006.01) |

(52) U.S. Cl.
CPC ......... *G07F 17/3267* (2013.01); *G06Q 50/34* (2013.01); *G07F 17/3288* (2013.01); *G07F 17/42* (2013.01)

(58) Field of Classification Search
CPC ... G07F 17/32; G07F 17/3214; G07F 17/3222
USPC .............................. 463/1, 20, 22, 25, 30, 39
See application file for complete search history.

(56) References Cited

U.S. PATENT DOCUMENTS

| | | | | |
|---|---|---|---|---|
| 6,126,543 | A | 10/2000 | Friedman | |
| 9,424,716 | B2 | 8/2016 | Marantelli | |
| 11,107,328 | B2 | 8/2021 | Nelson et al. | |
| 2014/0206435 | A1 | 7/2014 | Toohey et al. | |
| 2016/0133096 | A1* | 5/2016 | Alexander .......... | G07F 17/3244 463/25 |
| 2020/0265667 | A1* | 8/2020 | Amaitis .............. | G07F 17/3262 |
| 2021/0090405 | A1* | 3/2021 | Nelson ................ | G07F 17/3288 |
| 2021/0350669 | A1* | 11/2021 | Marantelli .......... | G07F 17/3276 |
| 2022/0130207 | A1 | 4/2022 | Huke et al. | |
| 2023/0267805 | A1 | 8/2023 | Edsall | |

* cited by examiner

*Primary Examiner* — Adetokunbo O Torimiro
(74) *Attorney, Agent, or Firm* — FisherBroyles, LLP; Rob L. Phillips

(57) ABSTRACT

A system and method for sports betting, permitting parlay bets to win even when one or more legs of the parlay bet lose by determining an aggregate amount by which each of the two or more legs of the parlay bet have exceed or fail to reach a pre-established point spread or value associated with each leg of said parlay bet and awarding a payout when said amount is positive. Side bets, bonuses, weight factors and multipliers may be incorporated. An award may require an aggregate amount to meet a positive threshold amount.

23 Claims, 9 Drawing Sheets

300

500

SPORTS BETTING SYSTEM AND METHOD OF USING THE SAME

FIELD OF INVENTION

The embodiments of the present invention relate to a sports betting system designed to increase player satisfaction and opportunities to win.

BACKGROUND

Sports betting, once legal in only Nevada, is now legal in 30+ states with more states considering legislation to legalize it. With the increase in popularity of sports betting comes the need for improved sports betting systems to attract and entertain players.

Parlay bets are well known in sports betting requiring selecting two or more winning results to win the parlay bet. Players like parlay bets because they provide better odds over straight bets (i.e., bets needing only one winning result to win and which typically pay even money). For example, a 2-leg parlay pays 13 to 5, a 3-leg parlay pays 6 to 1, a 4-leg parlay pays 11 to 1 and a 10-leg parlay pays 720-1.

The biggest negative aspect associated with parlay bets is the premise that a single losing leg of the parlay bet wipes out the entire parlay bet resulting in a total loss.

Accordingly, the embodiments of the present invention allow parlay bets to be won even with one or more losing legs. The embodiments of the present invention evaluate all legs of the parlay bet collectively to determine whether it is a winner or loser. Advantageously, the embodiments of the present invention work with all betting schemes including statistics (stats) betting, fantasy sports and certain non-sporting events like the stock market.

SUMMARY

The embodiments of the present invention are directed to a system comprising: a user interface; a processor running executable instructions; a memory device storing said executable instructions allowing said processor to: (i) receive a monetary bet, (ii) receive two or more legs of a parlay bet via said user interface; (iii) create a record of said parlay bet including a potential payout, (iv) evaluate said parlay bet once said two or more legs of said parlay bet have been decided, (v) determine an aggregate amount by which each of said two or more legs of said parlay bet have exceed or fail to reach a pre-established point spread or value associated with each leg of said parlay bet, (vi) award a payout when said aggregate amount is positive.

By way of example, a player may input a three-leg parlay comprising the following NBA games—Chicago Bulls +3, Los Angeles Lakers −4 and Oklahoma City Thunder −7. With a traditional parlay bet, each of the three teams needs to cover the spread for the player to win the parlay bet and the 6 to 1 payout. With the embodiments of the present invention, the player may win the parlay bet even if one or more of the teams does not cover the spread. For example, if the Chicago Bulls win by 3, the Los Angeles Lakers win by 13 and the Oklahoma City Thunder lose by 7, the player still wins the parlay bet based on the following calculation—Chicago Bulls have a +6 differential (+3 point spread and win by 3), the Los Angeles Lakers have a +9 differential (−4 point spread and win by 13) and the Oklahoma City Thunder have a −14 differential (−7 point spread and lose by 7) which sums to a positive aggregate outcome value of +1 (i.e., 6+9−14=+1) resulting in a winning parlay bet.

In another embodiment, different bet types may be combined. For example, a three-leg parlay combining a sports bets and two stats bets may look like: Chicago Bulls +3, Lebron James Over 20 points and Jalen Hurts over 212 throwing yards. With such bets, weight factors may be used to correlate the bet types. Those skilled in the art will recognize that any bet combinations are within the spirit and scope of the present invention.

Depending on the embodiment, there may be certain other conditions before a parlay bet is deemed a winning bet. In one embodiment, a majority or minimum percentage of the legs of the parlay bet may need to cover the spread or otherwise be deemed a winning outcome. That is, with a 3-leg parlay bet the player may need to win 2 legs of the parlay bet and with a 4-leg parlay the player may need to win 3 legs of the parlay bet and so on. In another embodiment, if the player achieves a positive outcome above a pre-established threshold, the payout may be enhanced. In another embodiment, the player may pre-select the range of the anticipated positive outcome and win if the range is achieved.

As set forth herein, the legs of the parlay bet may be directed to stats betting, sports bets, fantasy sports and combinations thereof. Moreover, the embodiments may be used with non-sporting events such as the stock market and other financial markets.

Other variations, embodiments and features of the present invention will become evident from the following detailed description, drawings and claims.

DETAILED DESCRIPTION

Figure 1:
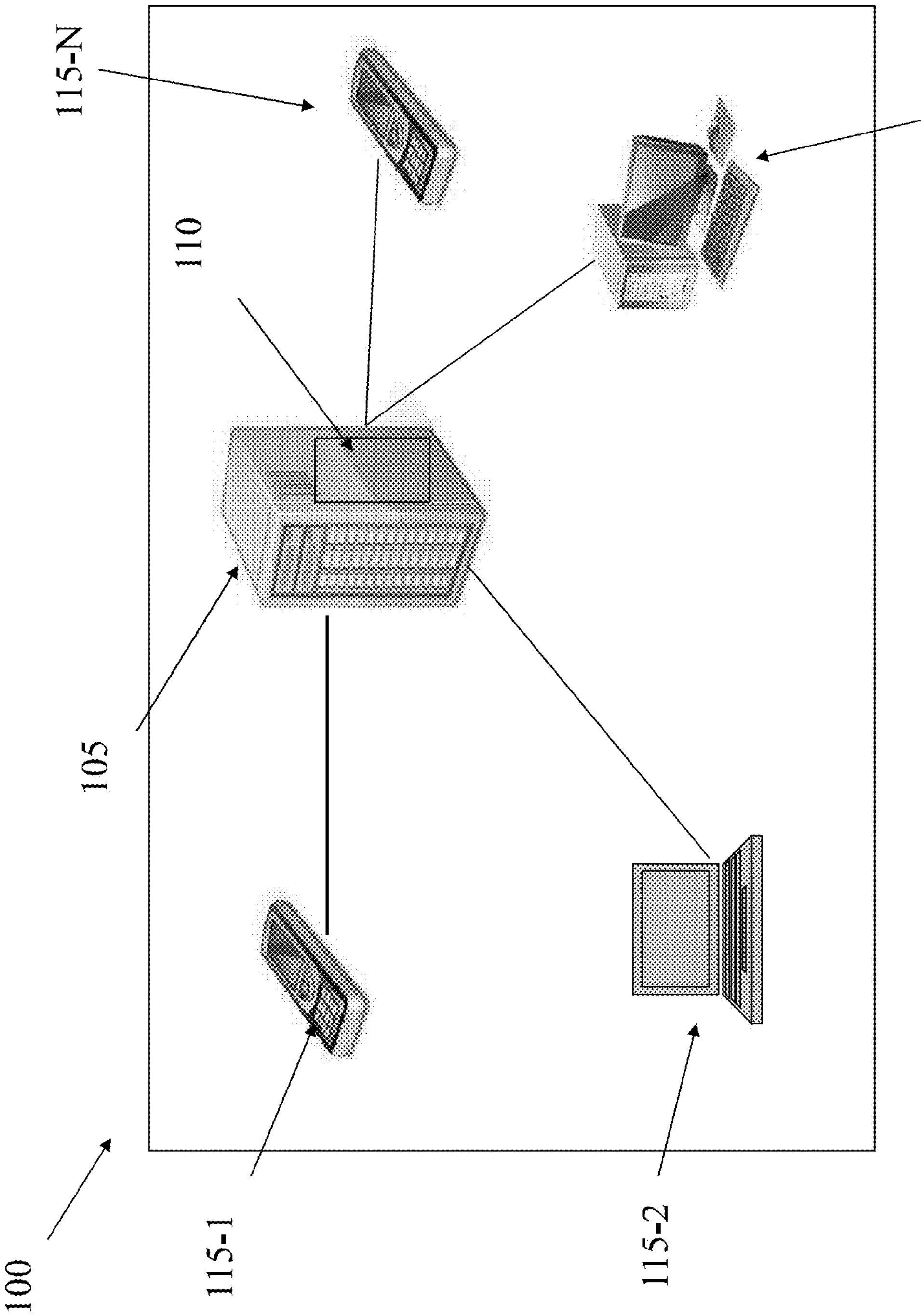
FIG. 1 illustrates a block diagram of a system that may be used to facilitate the embodiments of the present invention.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

Those skilled in the art will recognize that the embodiments of the present invention involve both hardware and software elements which portions are described below in such detail required to construct and operate a system and method according to the embodiments of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.), or an embodiment combining software and hardware. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), and optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied thereon, for example, in baseband or as part of a carrier wave. Such a propagated signal may take any variety of forms, including, but not limited to, electromagnetic, optical, or any suitable combination thereof. A computer readable signal medium may be any computer readable medium that is not a computer readable storage medium and that can communicate, propagate, or transport a program for use by or in conjunction with an instruction execution system, apparatus, or device.

Program code embodied on a computer readable medium may be transmitted using any appropriate medium, including but not limited to wireless, wireline, optical fiber cable, RF and the like, or any suitable combination of the foregoing.

Computer program code for carrying out operations for aspects of the present invention may be written in any combination of one or more programming languages, including an object-oriented programming language such as Java, Smalltalk, C++ or the like or conventional procedural programming languages, such as the "C" programming language, AJAX, PUP, HTML, XHTML, Ruby, CSS, Python or similar programming languages. The programming code may be configured in an application, an operating system, as part of a system firmware, or any suitable combination thereof. The programming code may execute entirely on the user's computer, partly on the user's computer, as a standalone software package, partly on the user's computer and partly on a remote computer or entirely on a remote computer or server as in a client/server relationship sometimes known as cloud computing. In the latter scenario, the remote computer may be connected to the user's computer through any type of network, including a local area network (LAN) or a wide area network (WAN), or the connection may be made to an external computer (for example, through the Internet using an Internet Service Provider).

Artificial intelligence (AI), including machine learning, expert systems, artificial superintelligence, artificial general intelligence, etc., may be used to optimize or otherwise carry out operations of the embodiments of the present invention. AI may, for example, generate predictive outcomes on which players place parlay bets. In a stock market embodiment, AI may generate predicted stock values for a next market day on which players may place parlay bets on whether the stock will rise or fall as predicted. AI may also be used to generate payouts.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagrams.

The embodiments of the present invention are directed to a system and method for accepting and resolving parlay bets. Parlay bets are common with sports betting and involve betting on multiple outcomes with a single bet. To win the parlay bet, all outcomes must be winners for the parlay bet to be a winner. Table 1 below shows an exemplary parlay bet payout chart comprising payouts based on the number of legs of the parlay.

TABLE 1

| NUMBER OF OUTCOMES | PAYOUT | HOUSE EDGE |
|---|---|---|
| 2 | 2.6 to 1 | 10% |
| 3 | 6 to 1 | 12.5% |
| 4 | 11 to 1 | 31.25% |
| 5 | 20 to 1 | 34.38% |
| 6 | 40 to 1 | 35.94% |
| 7 | 75 to 1 | 40.63% |
| 8 | 150 to 1 | 41.02% |
| 9 | 300 to 1 | 41.21% |
| 10 | 700 to 1 | 31.54% |

Despite the apparent large payouts set forth in Table 1, there is significant house advantage built into the payouts. With such large house edges, additional payouts are available for alternative winning outcomes while maintaining sufficient house edges. Alternatively, with the embodiments of the present invention, the payouts are reset based on the incorporation of additional payouts.

FIG. 1 shows a block diagram of a network 100 of the type that may facilitate the embodiments of the present invention. The network 100 comprises a processor-equipped parlay server 105, including one or more processors 110 running parlay software, and remote devices 115-1 through 115-N (e.g., smart phones) configured to access said parlay server 105 for purposes described herein. In one embodiment, the parlay server 105 may be accessed via a software application ("App") downloaded onto smart devices. Those skilled in the art will recognize that players may place parlay bets via a mobile device, laptop computer, desktop computer, kiosk or via an over-the-counter system.

Figure 2:
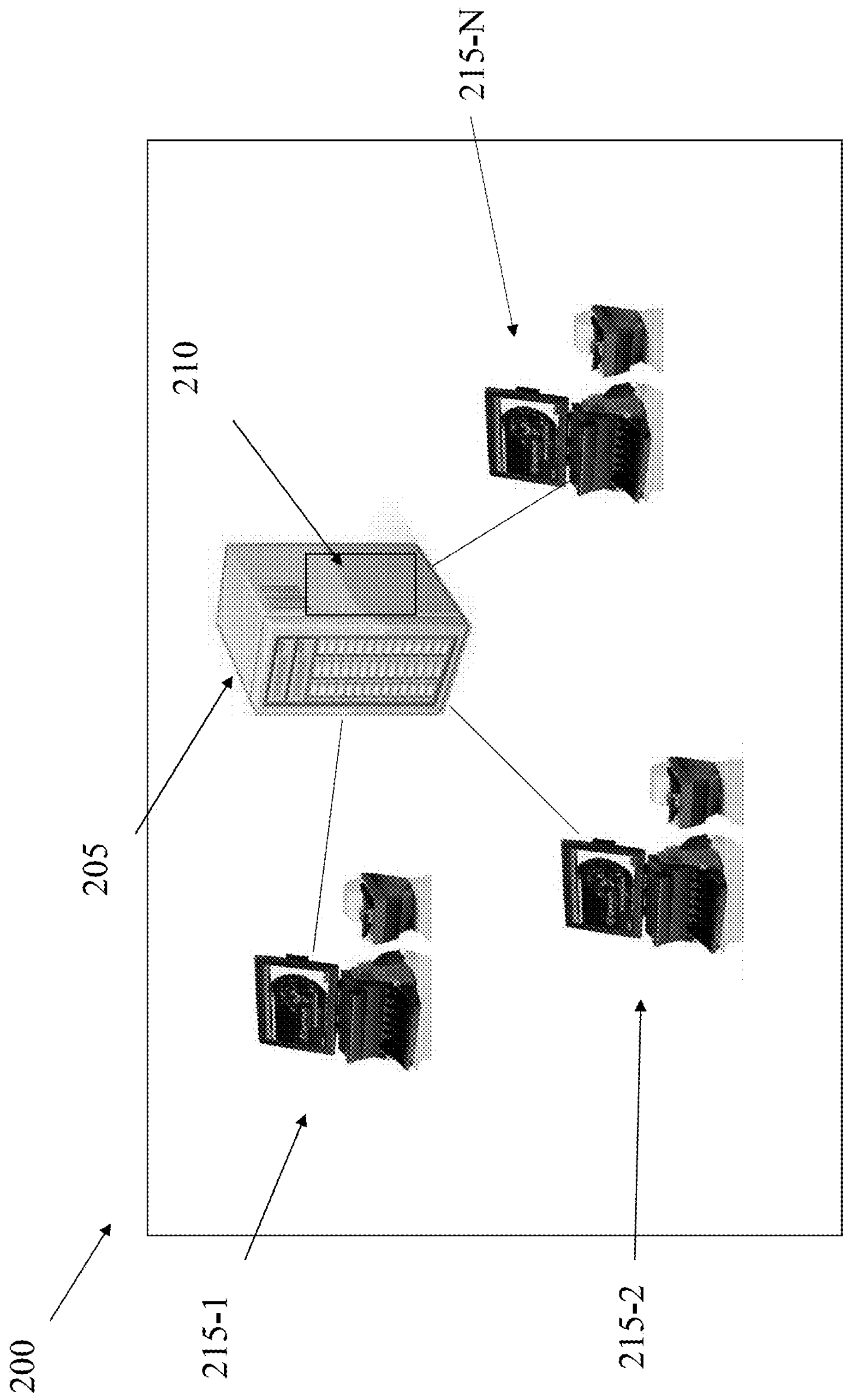
FIG. 2 illustrates an exemplary over-the-counter system for entering a parlay bet according to the embodiments of the present invention.

FIG. 2 shows a block diagram of a brick and mortar sports book network 200 of the type that may facilitate the embodiments of the present invention. The brick and mortar sports book network 200 comprises a processor-equipped parlay server 205, including one or more processors 210 running parlay software, and remote devices 215-1 through 215-N comprising point-of-sale terminals (manned or unmanned) having at least a bet interface and ticket printer configured to access said parlay server 205 and print betting tickets.

The embodiments of the present invention may use various pay table schemes. In a first embodiment, the pay table uses the typical payouts from Table 1 and further provides additional payouts for obtaining a positive aggregate outcome value. With this embodiment, the house edge for the casino or operator is reduced. Table 2 below shows an exemplary pay table with a reduced house edge. It is also conceivable that the player may be required to make a separate bet from the standard parlay bet for the opportunity to receive a payout when one or more legs of the parlay bet do not win.

TABLE 2

| NUMBER OF OUTCOMES | PAYOUT FOR WINNING EACH LEG | PAYOUT FOR LOSING ONE OR MORE LEGS BUT HAVING A POSITIVE AGGREGATE OUTCOME VALUE |
|---|---|---|
| 2 | 2.6 to 1 | 1 to 1 |
| 3 | 6 to 1 | 2 to 1 |
| 4 | 11 to 1 | 3 to 1 |
| 5 | 20 to 1 | 4 to 1 |
| 6 | 40 to 1 | 5 to 1 |
| 7 | 75 to 1 | 6 to 1 |
| 8 | 150 to 1 | 7 to 1 |
| 9 | 300 to 1 | 8 to 1 |
| 10 | 700 to 1 | 10 to 1 |

In another embodiment, the payouts are not segregated into two types. Table 3 below shows an exemplary pay table with a house edge consistent with Table 1.

TABLE 3

| NUMBER OF OUTCOMES | PAYOUT FOR LOSING ONE OR MORE LEGS BUT HAVING A POSITIVE AGGREGATE OUTCOME VALUE |
|---|---|
| 2 | 2 to 1 |
| 3 | 4.5 to 1 |
| 4 | 7 to 1 |
| 5 | 14 to 1 |
| 6 | 30 to 1 |
| 7 | 40 to 1 |
| 8 | 50 to 1 |
| 9 | 125 to 1 |
| 10 | 250 to 1 |

Table 3 may be modified in any number of ways as long as the house has the advantage. With this embodiment, a bonus payout may be made if the player wins all legs of the parlay bet.

As detailed below, certain embodiments may include enhanced payouts when a threshold positive aggregate outcome value is exceeded. In another embodiment, the player may be able to select and bet on a range of predicted positive aggregate outcome value. In another embodiment, a majority or minimum percentage of the legs of the parlay bet may need to win to receive a payout. That is, with a 3-leg parlay bet the player may need to win 2 legs of the parlay bet and with a 4-leg parlay the player may need to win 3 legs of the parlay bet and so on before a payout is made.

Figure 3:
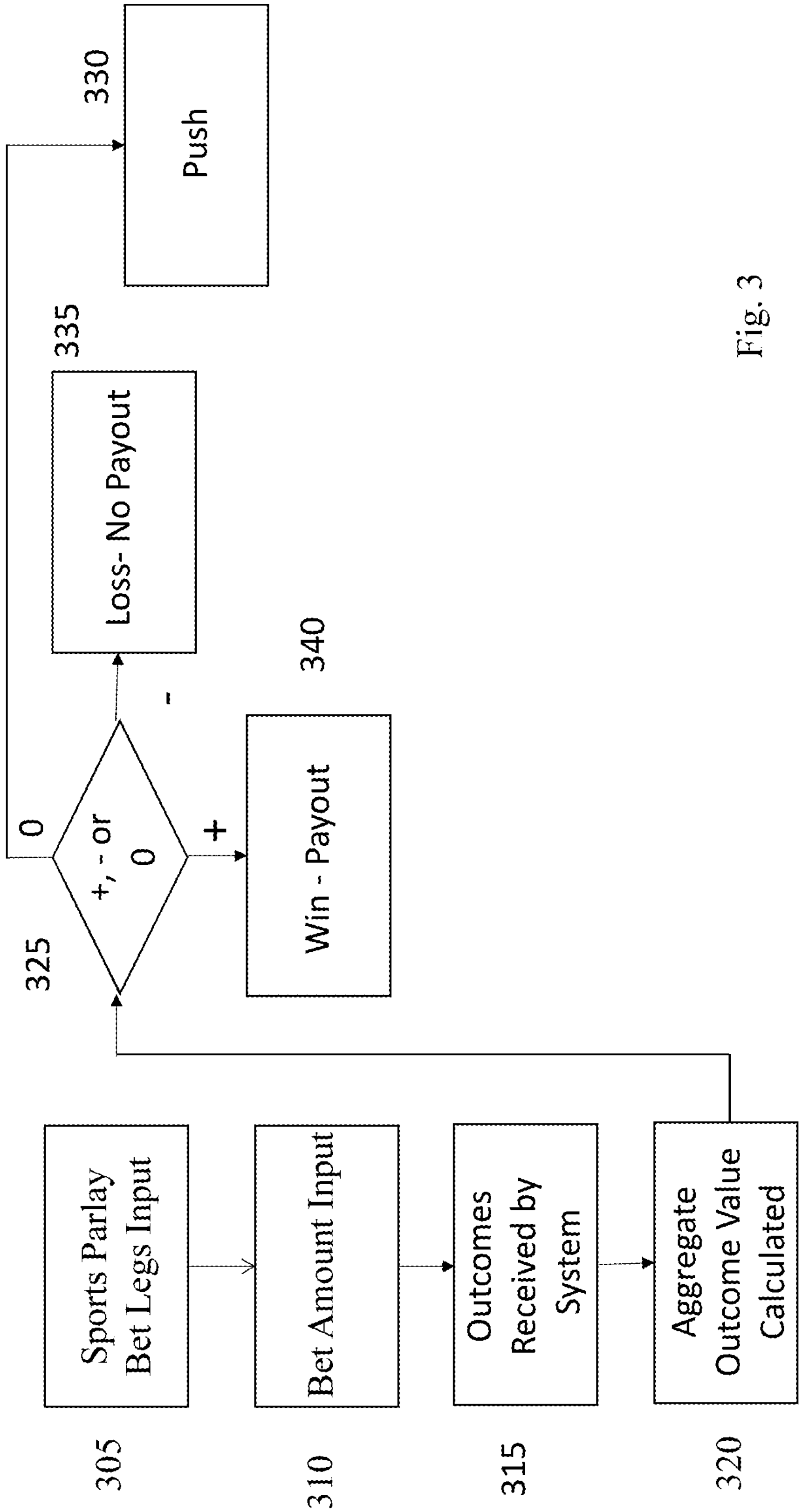
FIG. 3 illustrates a flow chart of one methodology for the system to accept and resolve a sports parlay bet according to the embodiments of the present invention.

FIG. 3 shows a flow chart 300 of one methodology for the system to accept and resolve a sports parlay bet according to the embodiments of the present invention. In this instance, the payouts from Table 3 are the type used. At step 305, a player enters the legs of a sports parlay bet via a user interface (e.g., mobile device) or point-of-sale terminal. The point-of-sale terminal may be manned or unmanned. At 310, the player selects the amount of the parlay bet via the user interface or point-of-sale terminal. At 315, once the legs of the sports parlay bet are completed, the outcomes are received or located by the system. In one embodiment, the system is linked to a sports data entity that tracks all live sporting events. The system may then grab the necessary outcomes from the sports data entity or be sent the necessary outcomes from the sports data entity. At 320, the sports parlay bet is resolved by calculating the aggregate outcome value. At 325, it is determined if the aggregate outcome value is positive, negative or zero. If zero, at 330, the sports parlay bet is deemed a push with no payout and a return of the sports parlay bet. In other embodiments, a zero aggregate outcome value may be deemed a win or loss. If, at 325, the aggregate outcome value is negative, at 335, the sports parlay bet is deemed a loss with no payout. If, at 325, the aggregate outcome value is positive, at 340, the sports parlay bet is deemed a win and the corresponding payout is made.

Figure 4:
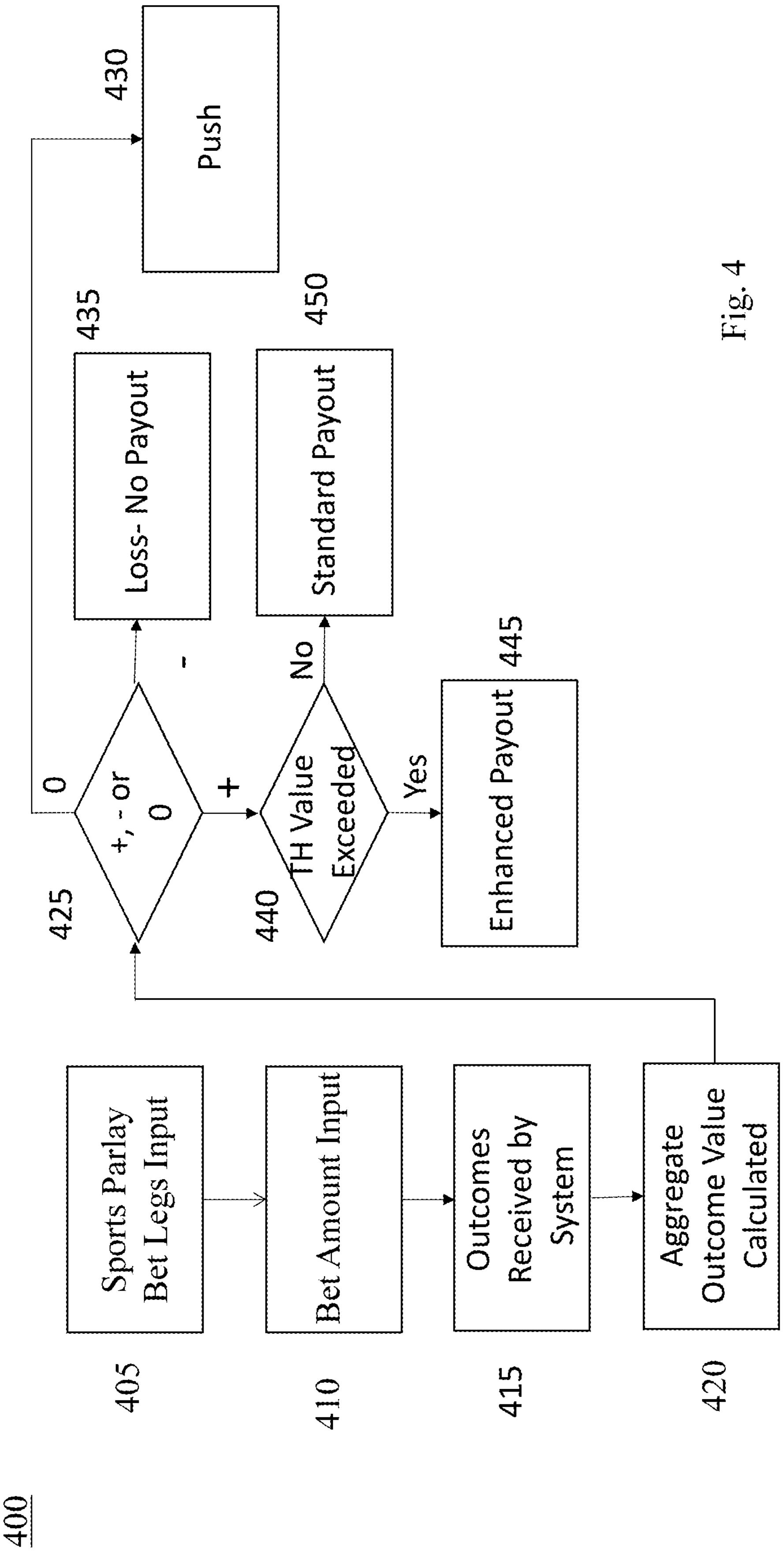
FIG. 4 illustrates a flow chart of another methodology for the system to accept and resolve a sports parlay bet according to the embodiments of the present invention.

FIG. 4 shows a flow chart 400 of another methodology for the system to accept and resolve a sports parlay bet according to the embodiments of the present invention. In this instance, the payouts from Table 3 are the type used. At step 405, a player enters the legs of a sports parlay bet via a user interface (e.g., mobile device) or point-of-sale terminal. The point-of-sale terminal may be manned or unmanned. At 410, the player selects the amount of the parlay bet via the user interface or point-of-sale terminal. At 415, once the legs of the sports parlay bet are completed, the outcomes are received or located by the system. In one embodiment, the system is linked to a sports data entity that tracks all live sporting events. The system may then grab the necessary outcomes from the sports data entity or be sent the necessary outcomes from the sports data entity. At 420, the sports parlay bet is resolved by calculating the aggregate outcome value. At 425, it is determined if the aggregate outcome value is positive, negative or zero. If zero, at 430, the sports parlay bet is deemed a push with no payout and a return of the sports parlay bet. In other embodiments, a zero aggregate outcome value may be deemed a win or loss. If, at 425, the aggregate outcome value is negative, at 435, the sports parlay bet is deemed a loss with no payout. If, at 425, the aggregate outcome value is positive, at 440, it is determined if the aggregate outcome value exceeds a threshold value. If so, at 445, an enhanced payout is made. If not, at 450, a standard payout is made.

Figure 5:
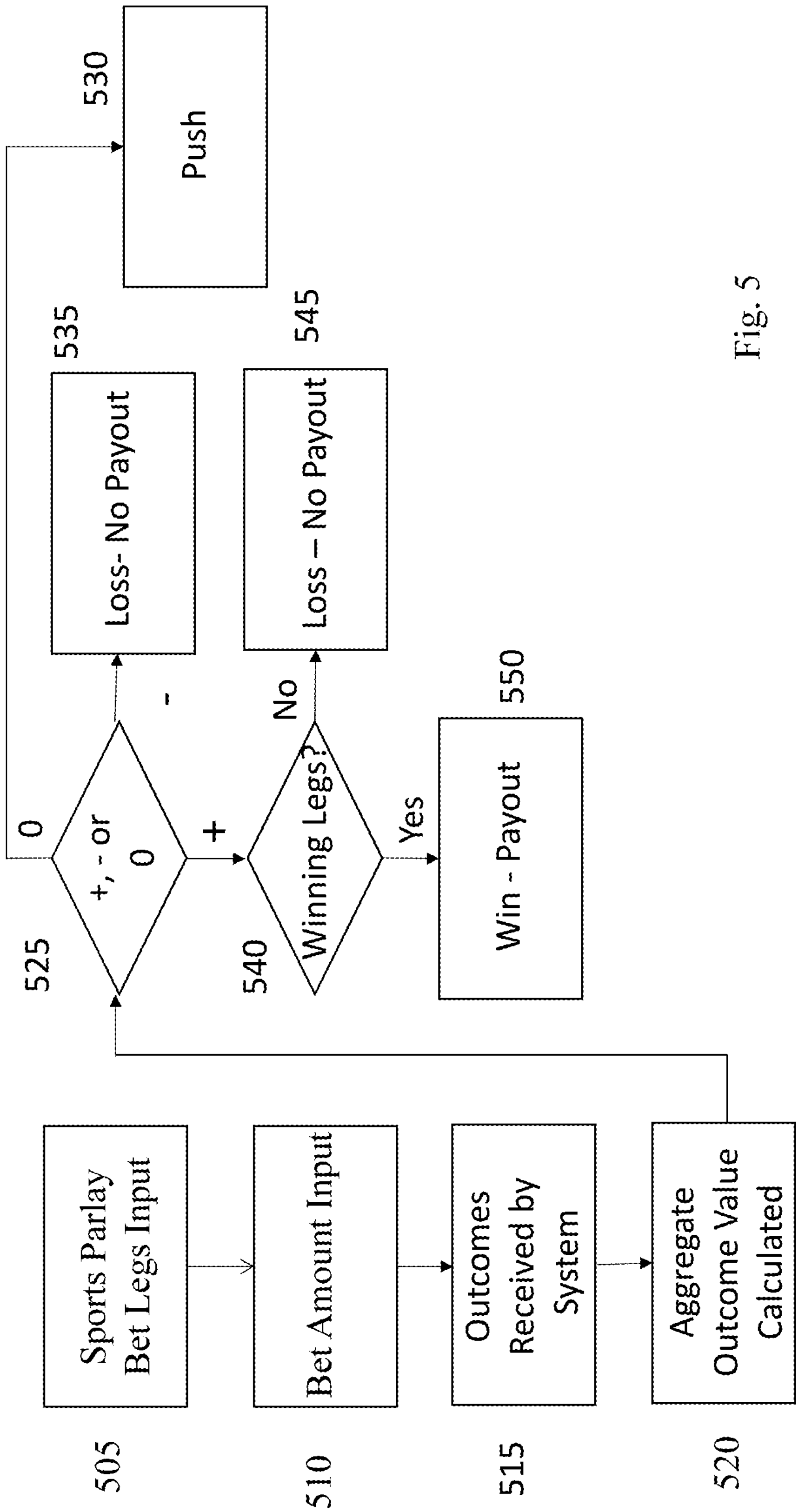
FIG. 5 illustrates a flow chart of another methodology for the system to accept and resolve a sports parlay bet according to the embodiments of the present invention.

FIG. 5 shows a flow chart 500 of another methodology for the system to accept and resolve a sports parlay bet according to the embodiments of the present invention. In this instance, the payouts from Table 3 are the type used. At step 505, a player enters the legs of a sports parlay bet via a user interface (e.g., mobile device) or point-of-sale terminal. The point-of-sale terminal may be manned or unmanned. At 510, the player selects the amount of the parlay bet via the user interface or point-of-sale terminal. At 515, once the legs of the sports parlay bet are completed, the outcomes are received or located by the system. In one embodiment, the system is linked to a sports data entity that tracks all live sporting events. The system may then grab the necessary outcomes from the sports data entity or be sent the necessary outcomes from the sports data entity. At 520, the sports parlay bet is resolved by calculating the aggregate outcome value. At 525, it is determined if the aggregate outcome value is positive, negative or zero. If zero, at 530, the sports parlay bet is deemed a push with no payout and a return of the sports parlay bet. In other embodiments, a zero aggregate outcome value may be deemed a win or loss. If, at 525, the aggregate outcome value is negative, at 535, the sports parlay bet is deemed a loss. If, at 525, the aggregate outcome value is positive, at 540, it is determined if the number of winning legs meets a pre-established threshold number or percentage. If not, at 545, the parlay bet is deemed a loser with no payout. If, at 540, the number of winning legs meets the threshold number or percentage, at 550, the parlay bet is deemed a winner and the corresponding payout is made.

Figure 6:
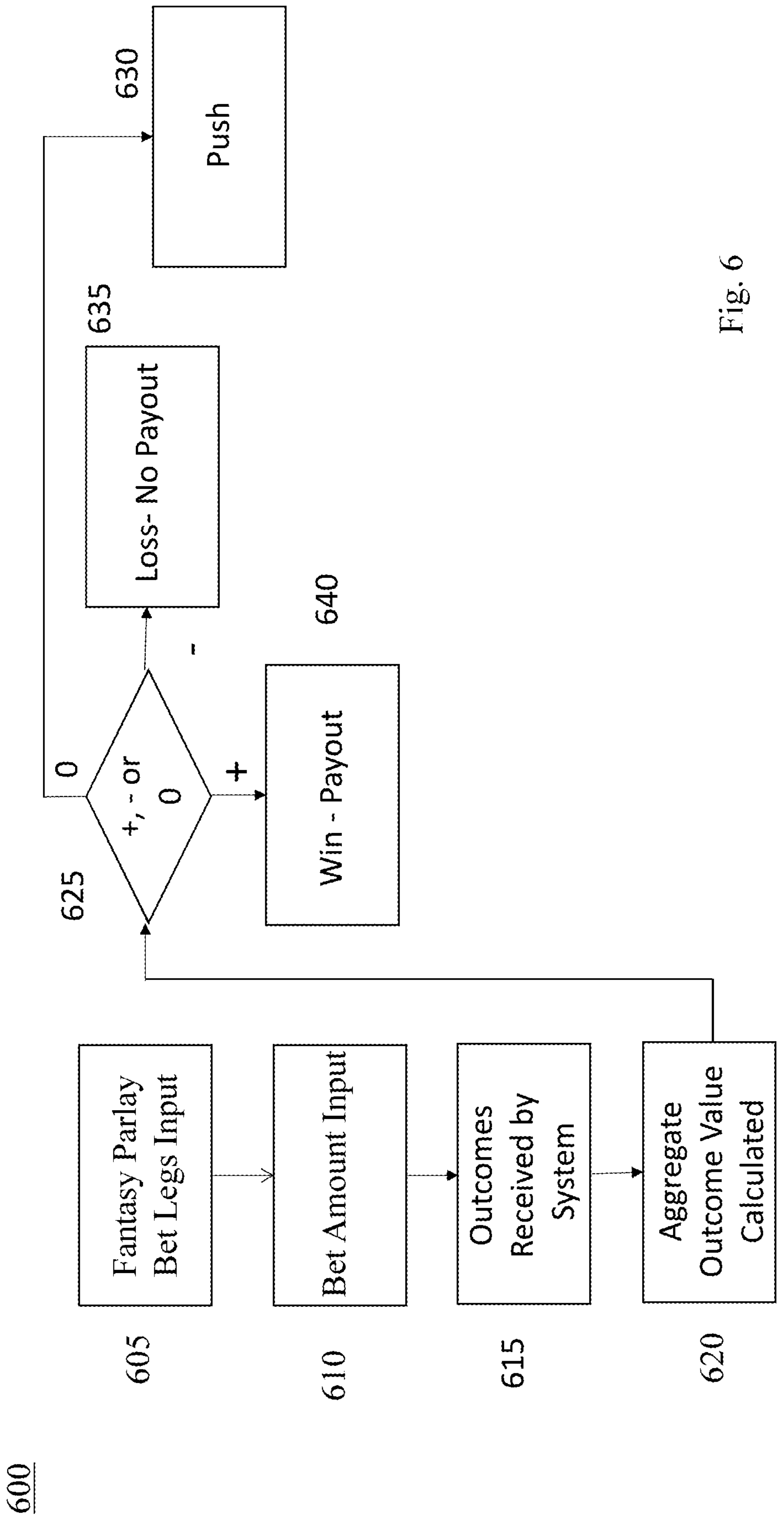
FIG. 6 illustrates a flow chart of one methodology for the system to accept and resolve a fantasy sports parlay bet according to the embodiments of the present invention.

FIG. 6 shows a flow chart 600 of one methodology for the system to accept and resolve a fantasy sports parlay bet according to the embodiments of the present invention. In this instance, the payouts from Table 3 are the type used. At step 605, a player enters the legs of a fantasy sports parlay bet via a user interface (e.g., mobile device) or point-of-sale terminal. The point-of-sale terminal may be manned or unmanned. At 610, the player selects the amount of the parlay bet via the user interface or point-of-sale terminal. At 615, once the legs of the fantasy parlay bet are completed, the outcomes are received or located by the system. In one embodiment, the system is linked to a fantasy sports data entity that tracks all live sporting events and corresponding fantasy scores. The system may then grab the necessary outcomes from the fantasy sports data entity or be sent the necessary outcomes from the fantasy sports data entity. At 620, the fantasy sports parlay bet is resolved by calculating the aggregate outcome value. At 625, it is determined if the aggregate outcome value is positive, negative or zero. If zero, at 630, the fantasy sports parlay bet is deemed a push with no payout and a return of the fantasy sports parlay bet. In other embodiments, a zero aggregate outcome value may be deemed a win or loss. If, at 625, the aggregate outcome value is negative, at 635, the fantasy sports parlay bet is deemed a loss. If, at 625, the aggregate outcome value is positive, at 640, the fantasy sports parlay bet is deemed a win and, at 650, the corresponding payout is made.

Figure 7:
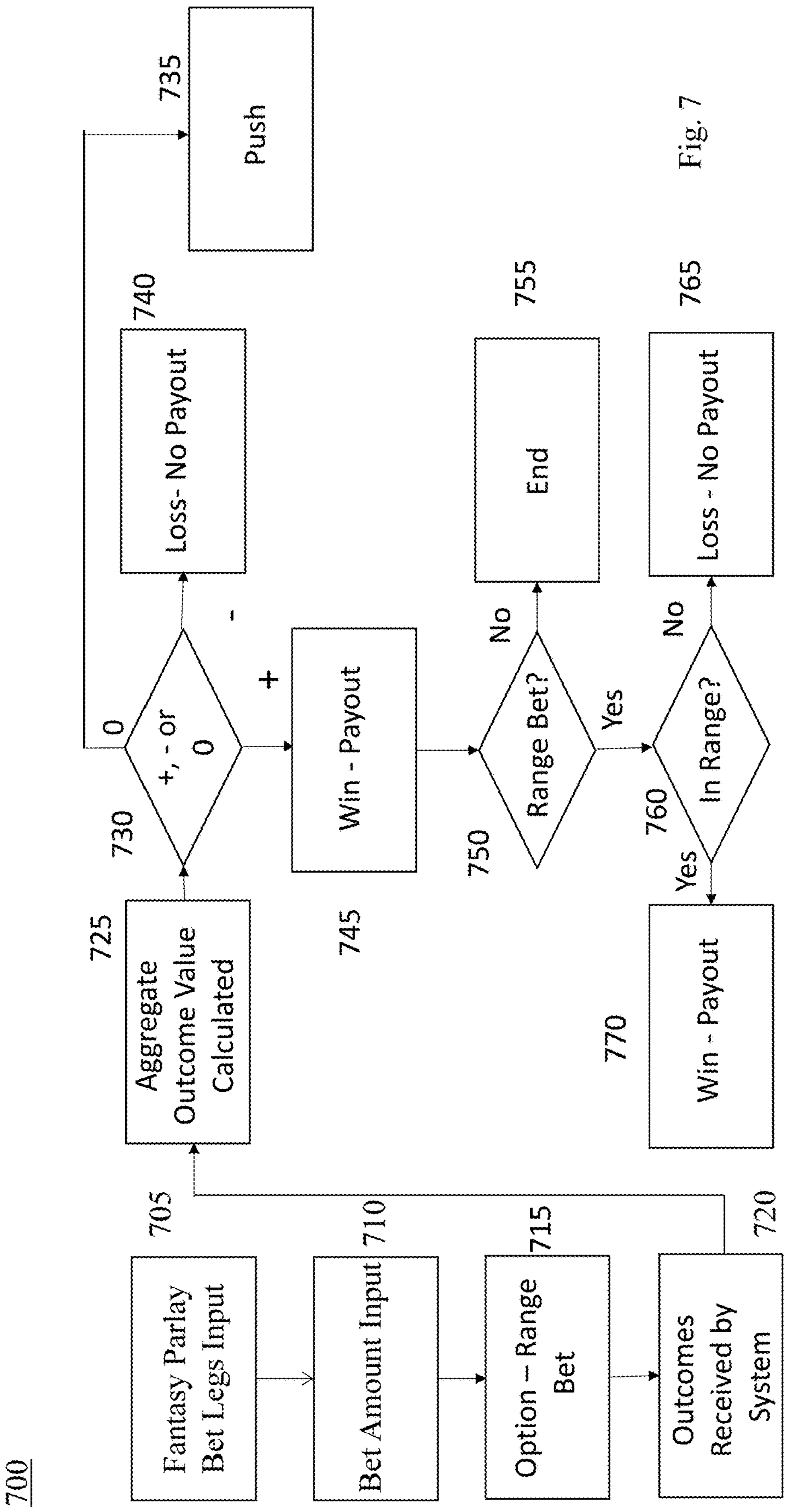
FIG. 7 illustrates a flow chart of another methodology for the system to accept and resolve a fantasy sports parlay bet according to the embodiments of the present invention.

FIG. 7 shows a flow chart 700 of another methodology for the system to accept and resolve a fantasy sports parlay bet according to the embodiments of the present invention. In this instance, the payouts from Table 3 are the type used. At step 705, a player enters the legs of a fantasy parlay bet via a user interface (e.g., mobile device) or point-of-sale terminal. The point-of-sale terminal may be manned or unmanned. At 710, the player selects the amount of the parlay bet via the user interface or point-of-sale terminal. At 715, the player has the option to place a bet on an anticipated range of positive aggregate outcome value. For example, with a parlay bet based on football game outcomes, the player has the option of betting on whether the aggregate positive outcome range is between 4 and 6, 7 and 10 or 10 and above. At 720, once the legs of the fantasy sports parlay bet are completed, the outcomes are received or located by the system. In one embodiment, the system is linked to a fantasy sports data entity that tracks all live sporting events and corresponding fantasy scores. The system may then grab the necessary outcomes from the fantasy sports data entity or be sent the necessary outcomes from the fantasy sports data entity. At 725, the fantasy sports parlay bet is resolved by calculating the aggregate outcome value. At 730, it is determined if the aggregate outcome value is positive, negative or zero. If zero, at 735, the fantasy sports parlay bet is deemed a push with no payout and a return of the fantasy sports parlay bet. In other embodiments, a zero aggregate outcome value may be deemed a win or loss. If, at 730, the aggregate outcome value is negative, at 740, the fantasy sports parlay bet is deemed a loss with no payout. If, at 730, the aggregate outcome value is positive, at 745, the fantasy sports parlay bet is deemed a win and the corresponding payout is made. At 750, it is determined if the player bet on the anticipated range of positive aggregate outcome value. If not, at 755, the parlay bet ends. If so, at 760, it is determined if the positive aggregate outcome value is within the range bet on. If not, at 765, the bet on the anticipated range of positive aggregate outcome value is deemed a loss with no payout. If, at 760, it is determined that the positive aggregate outcome value is within the range bet on, at 770, the range bet is deemed a winner and a corresponding payout is made.

Table 4 below shows an exemplary 5-leg fantasy sports parlay bet according to the embodiments of the present invention.

TABLE 4

| LEG | OUTCOME |
|---|---|
| 1 | Patrick Mahomes over 16 points |
| 2 | Josh Jacobs under 17 points |
| 3 | Justin Jefferson over 18 points |
| 4 | Jamar Chase over 23 points |
| 5 | Lamar Jackson under 25 points |

With a standard parlay bet, if any of the 5 legs shown in Table 4 do not win, the parlay bet is lost. With the embodiments of the present invention, if one or more legs lose, the parlay bet may still win and be entitled to a payout. For example, if after all games are played Mahomes has 15 points (losing leg), Jacobs has 19 points (losing leg), Jefferson has 20 points (winning leg), Chase has 24 points (winning leg) and Jackson has 24 points (winning leg), the parlay bet according to the embodiments of the present invention is deemed a winner based on the following calculation. The Mahomes leg lost by one point (−1), the Jacobs leg lost by two points (−2), the Jefferson leg won by two points (+2), the Chase leg won by one point (+1) and the Jackson leg won by one point (+1) which when aggregated results in a positive outcome value of +1 (−1−2+2+1+1=+1).

In another embodiment, a fantasy pool may be created whereby multiple players pay an entry fee and each selects legs of fantasy sports parlay. In this instance, the players with the highest positive aggregate outcome value are awarded prizes based on a prize pool formed of the entry fees minus administrative costs. In one embodiment, certain legs are assigned multipliers such that a final positive or negative aggregate outcome value is increased or decreased, respectively. The multipliers may be randomly assigned to one or more legs, assigned to one or more operator-assigned legs and/or assigned to one or more player-selected legs. In such an embodiment, if a leg is assigned a 3× multiplier and finishes with a +3 outcome value, the +3 outcome value is increased to +9. In the same vein, if the leg assigned the 3× multiplier, finishes with a −3 outcome value, the −3 outcome value is decreased to −9. In other words, the multiplier may help or hurt the player.

Figure 8:
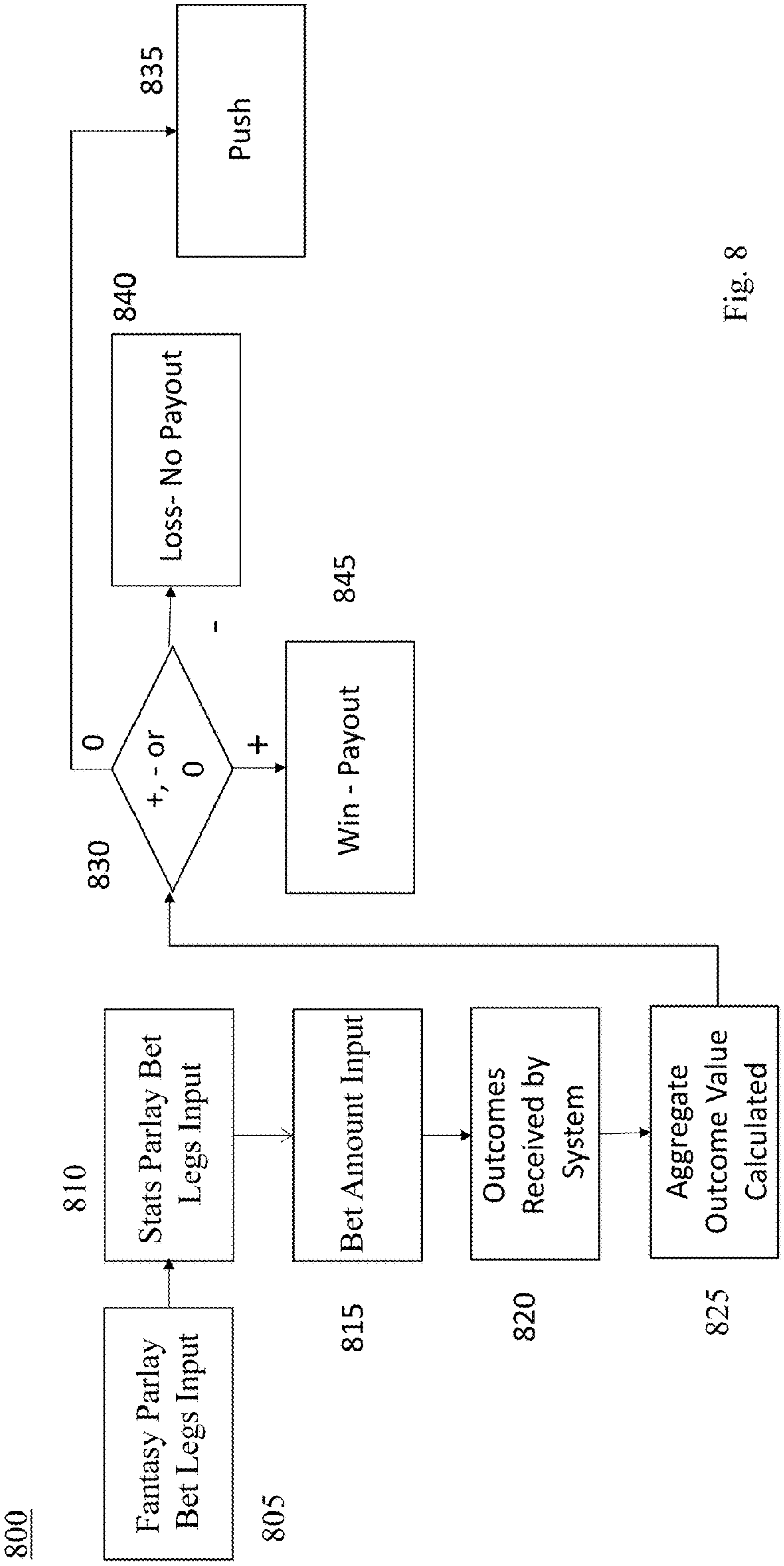
FIG. 8 illustrates a flow chart of a methodology for the system to accept and resolve a combination fantasy sports and stats parlay bet according to the embodiments of the present invention.

FIG. 8 shows a flow chart 800 of one methodology for the system to accept and resolve a combination fantasy sports and stats parlay bet according to the embodiments of the present invention. In this instance, the payouts from Table 3 are the type used. At step 805, a player enters the legs of a fantasy sports parlay bet via a user interface (e.g., mobile device) or point-of-sale terminal. The point-of-sale terminal may be manned or unmanned. At 810, the player enters the legs of the stats parlay bet via the user interface. At 815, the player selects the amount of the parlay bet via the user interface or point-of-sale terminal. At 820, once the legs of the fantasy parlay bet are completed, the outcomes are received or located by the system. In one embodiment, the system is linked to a fantasy sports data entity that tracks all live sporting events and corresponding fantasy scores. The system may then grab the necessary outcomes from the fantasy sports data entity or be sent the necessary outcomes from the fantasy sports data entity. At 825, the fantasy sports parlay bet is resolved by calculating the aggregate outcome value. At 830, it is determined if the aggregate outcome value is positive, negative or zero. If zero, at 835, the fantasy sports parlay bet is deemed a push with no payout and a return of the fantasy sports parlay bet. In other embodiments, a zero aggregate outcome value may be deemed a win or loss. If, at 830, the aggregate outcome value is negative, at 840 the fantasy sports parlay bet is deemed a loss. If, at 830, the aggregate outcome value is positive, at 845, the fantasy sports parlay bet is deemed a win and, at 850, the corresponding payout is made.

When bet types are combined, it may be necessary to use certain weight factors to correlate the legs of the parlay bet. For example, if the legs of a sports bet and stats parlay bet are Chicago Bulls +3, Lebron James Over 20 points and Jalen Hurts over 212 throwing yards, the Chicago Bulls +3 and the Lebron James over 20 points legs may be weighted to correlate to Jalen Hurts over 212 yards leg since yards are easier to come by than points. For example, each point may be worth 5 yards such that if the Bulls win by 10, the Chicago Bulls leg is worth 35 points ((10−3)×5)) and if Lebron James scores only 10 points, the LeBron James leg is worth −50 points ((10−20)×5). The weight factors are calculated by the system based on historical data, player metrics, etc.

Also, when all bets are the same type, it may be necessary to use certain weight factors to correlate the legs of the parlay bet. For example, if the legs of a stats parlay bet are Patrick Mahomes to throw for more than 270 yards, Jalen Hurts to throw for more than 250 yards and Corey Seager to hit a single homerun (i.e., +0.5 homeruns for the game), the homerun leg needs to be weighted. For example, if Corey Seager hits a homerun it may be worth 25 points and if Corey Seager does not hit a homerun it may be worth −25 points. If Corey Seager hits 2 homeruns it may be +50 points, etc. The weight factors are calculated by the system based on historical data, player metrics, etc.

Figure 9:
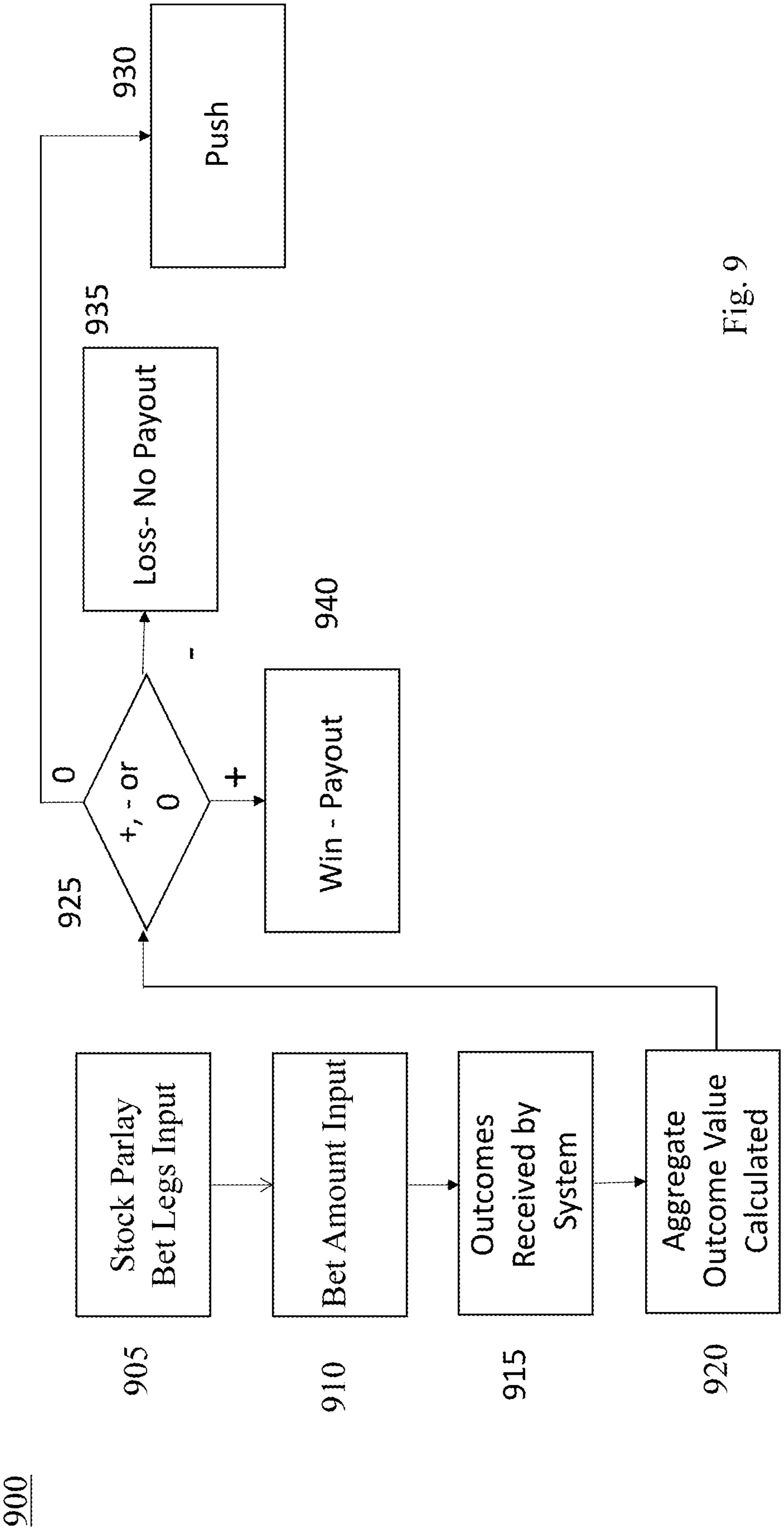
FIG. 9 illustrates a flow chart of one methodology for the system to accept and resolve a stock market parlay bet according to the embodiments of the present invention.

FIG. 9 illustrates a flow chart 900 of another methodology for the system to accept and resolve a stock market parlay bet according to the embodiments of the present invention. In this instance, the predicted stock market values are determined by human experts or software-based systems (e.g., AI). At step 905, a player enters a stock parlay bet via a user interface (e.g., mobile device) or point-of-sale terminal. The point-of-sale terminal may be manned or unmanned. At 910, the player selects the amount of the parlay bet via the user interface or point-of-sale terminal. At 915, once the stock market closes, the stock values are received or located by the system. In one embodiment, the system is linked to a stock data entity that tracks all stock values. The system may then grab the necessary stock values from the stock data entity or be sent the necessary stock values from the stock data entity. At 920, the stock parlay bet is resolved by calculating the aggregate stock values above and below the predicted stock values. At 925, it is determined if the aggregate stock value is positive, negative or zero. If zero, at 930, the stock parlay bet is deemed a push with no payout and a return of the stock parlay bet. In other embodiments, a zero aggregate stock value may be deemed a win or loss. If, at 925, the aggregate stock value is negative, at 935, the stock parlay bet is deemed a loss. If at, 925, the aggregate stock value is positive, at 940, the stock parlay bey is deemed a win and the corresponding payout is made.

Table 5 below shows another exemplary 5-leg parlay bet placed on various over/under outcomes during a football game.

TABLE 5

| LEG | OUTCOME |
|---|---|
| 1 | Patrick Mahomes over 267.5 yards passing |
| 2 | Kansas City over 350 yards offense |
| 3 | Xavier Worthy over 49.5 yards receiving |
| 4 | Kareem Hunt under 37.5 yards rushing |
| 5 | Patrick Mahomes over 17.5 yards rushing |

With a standard parlay bet, if any of the 5 legs shown in Table 5 do not win, the parlay bet is lost. With the embodiments of the present invention, if one or more legs lose, the parlay bet may still win and be entitled to a payout. For example, if after all games are played Mahomes has 260 yards passing (losing leg), Kansas City has 355 yards of offense (winning leg), Worthy has 60 yards receiving (winning leg), Hunt has 30 yards rushing (losing leg) and Mahomes has 23 yards rushing (winning leg), the parlay bet according to the embodiments of the present invention is deemed a winner based on the following calculation. The Mahomes passing leg lost by 7.5 yards (−7.5), the Kansas City leg won by 5 yards (+5), the Worthy leg won by 10.5 yards (+10.5), the Hunt leg lost by 7.5 yards (−7.5) and the Mahomes rushing leg won by 5.5 yards (+5.5) which when aggregated results in a positive outcome value of +6 (−7.5+5+10.5−7.5+5.5=+6).

In another embodiment, the winning threshold may need to be more than merely positive. In other words, some parlays may require the positive outcome value to exceed a pre-established positive outcome value threshold (e.g., +3). In such an embodiment, the pre-established positive outcome value threshold is determined based on the number of parlay legs and bet types. With this embodiment, the pre-established positive outcome value threshold is known and provided to the player. For example, with a physical ticket, the pre-established positive outcome value threshold is printed on the ticket whereas with a digital bet the pre-established positive outcome value threshold is displayed. In one digital embodiment, the player is required to proactively approve the pre-established positive outcome value threshold and is depicted on a digital betting ticket.

Although the invention has been described in detail with reference to several embodiments, additional variations and modifications exist within the scope and spirit of the invention as described and defined in the following claims.

We claim:

1. A system for paving a parlay bet when less than all legs of said parlay bet win, comprising:

a user interface;

a processor running executable instructions;

a memory device storing said executable instructions allowing said processor to: (i) receive a monetary bet; (ii) receive two or more legs of a parlay bet via said user interface; (iii) create a record of said parlay bet including a potential payout; (iv) evaluate said parlay bet once said two or more legs of said parlay bet have been decided to determine a positive or negative outcome value by which each leg of said two or more legs of said parlay bet exceeds or fails to exceed, respectively, a pre-established point spread or value associated with each leg of said two or more legs of said parlay bet and sum said outcome value for each leg of said two or more legs of said parlay bet to determine a total outcome value for all legs of said parlay bet; and (v) award a payout when said total outcome value for all legs of said parlay bet is positive; and a data entity configured to provide said processor with access to results of said two or more legs of said parlay bet for evaluation under step (iv).

2. The system of claim 1 wherein said user interface is part of a terminal configured to print a betting ticket.

3. The system of claim 1 wherein said processor is further running executable instructions allowing said processor to: determine whether said total outcome value exceeds a pre-established threshold amount; and award a payout if said total outcome value exceeds said pre-established threshold amount.

4. The system of claim 1 wherein said processor is further running executable instructions allowing said processor to: receive a range selection of said total outcome value; and award a payout if said total outcome value lands within said range selection.

5. The system of claim 1 wherein said parlay bet is based on stats betting, sporting event outcomes, fantasy point projections or stock value projections.

6. The system of claim 1 wherein said processor is further running executable instructions allowing said processor to: determine whether a number of losing legs of said parlay bet is below a pre-established threshold number; and not award a payout if said number of losing legs of said parlay bet is greater than said pre-established threshold number.

7. The system of claim 1 wherein said processor is further running executable instructions allowing said processor to: utilize weight factors on one or more legs of said parlay bet.

8. The system of claim 1 wherein step (v) is amended to award a payout when said total outcome value is positive and exceeds a pre-established positive outcome value threshold.

9. A system for paving a parlay bet when less than all legs of said parlay bet win, comprising:

a user interface configured to allow a player to place a monetary parlay bet on results of two or more future events, said one or more future events comprising one or more of the following: sporting events, fantasy point projections and stock value projections;

a processor running executable instructions;

a memory device storing said executable instructions allowing said processor to: (i) create a record of said parlay bet including a potential payout; (ii) collect or receive said results of said two or more future events; (iii) determine positive or negative outcome value by which each future event of said two or more future events exceeds or fails to exceed, respectively, a pre-established point spread or value associated with each future event of said two or more future events and sum said outcome value for all future events of said two or more future events to determine a total outcome value; and (iv) award a payout when said total outcome value for all future events of said two or more future events is positive; and a data entity configured to provide said processor with access to results of said two or more future events under step (ii).

10. The system of claim 9 wherein said user interface is part of a terminal configured to print a betting ticket.

11. The system of claim 9 wherein said processor is further running executable instructions allowing said processor to: determine whether said total outcome value exceeds a pre-established threshold amount; and award a payout if said total outcome value exceeds said pre-established threshold amount.

12. The system of claim 9 wherein said processor is further running executable instructions allowing said processor to: receive a range selection of said total outcome value; and award a payout if said total outcome value lands within said range selection.

13. The system of claim 9 wherein said parlay bet is based on stats betting, sporting event outcomes, fantasy point projections or stock value projections.

14. The system of claim 9 wherein said processor is further running executable instructions allowing said processor to: determine whether a number of losing legs of said parlay bet is below a pre-established threshold number; and not award a payout if said number of losing legs of said parlay bet is greater than said pre-established threshold number.

15. The system of claim 9 wherein said processor is further running executable instructions allowing said processor to: utilize weight factors on one or more legs of said parlay bet.

16. The system of claim 9 wherein step (iv) is amended to award a payout when said total outcome values is positive and exceeds a pre-established positive outcome value threshold.

17. A method for paving a parlay bet when less than all legs of said parlay bet win, comprising:

via a user interface, receiving a monetary bet;

via said user interface, receiving two or more legs of a parlay bet;

printing or digitally storing a record of said parlay bet including a potential payout;

via a processor, evaluating said parlay bet once said two or more legs of said parlay bet have been decided;

via said processor, determining a positive or negative outcome value by which each leg of said two or more legs of said parlay bet exceeds or fails to exceed, respectively, a pre-established point spread or value associated with each leg of said two or more legs of said parlay bet and summing each outcome value of each leg of said two or more legs of said parlay bet to determine total outcome value;

via said processor, awarding a payout when said total outcome value of each leg of said two or more legs of said parlay bet is positive; and a data entity configured to provide said processor with access to results of said two or more legs of said parlay bet for evaluating said parlay bet once said two or more legs of said parlay bet have been decided.

18. The method of claim 17 further comprising, via said processor, determining whether said total outcome value exceeds a pre-established threshold amount; and awarding a payout if said outcome value exceeds said pre-established threshold amount.

19. The method of claim 17 further comprising, via said processor, receiving a range selection of said total outcome value; and awarding a payout if said total outcome value lands within said range selection.

20. The method of claim 17 wherein said parlay bet is based on stats betting, sporting event outcomes, fantasy point projections or stock value projections.

21. The method of claim 17 further comprising, via said processor, determining whether a number of losing legs of said parlay bet is below a pre-established threshold number; and not awarding a payout if said number of losing legs of said parlay bet is greater than said pre-established threshold number.

22. The method of claim 17 wherein said processor is further configured to: utilize weight factors on one or more legs of said parlay bet.

23. The method of claim 17 further comprising awarding a payout when said total outcome value is positive and exceeds a pre-established positive outcome value threshold.

* * * * *